United States Patent
Hong et al.

(10) Patent No.: US 8,932,500 B2
(45) Date of Patent: Jan. 13, 2015

(54) DEVICE AND METHOD FOR MANUFACTURING STATOR OF ULTRA HIGH SPEED INDUCTION MOTOR

(75) Inventors: Seungsoo Hong, Busan (KR); Sungwoo Yang, Busan (KR)

(73) Assignee: Gem Co., Ltd., Busan (KR)

( * ) Notice: Subject to any disclaimer, the term of this patent is extended or adjusted under 35 U.S.C. 154(b) by 224 days.

(21) Appl. No.: 13/518,172
(22) PCT Filed: Aug. 16, 2011
(86) PCT No.: PCT/KR2011/005993
§ 371 (c)(1), (2), (4) Date: Jun. 21, 2012
(87) PCT Pub. No.: WO2013/018949
PCT Pub. Date: Feb. 7, 2013

(65) Prior Publication Data
US 2013/0026671 A1 Jan. 31, 2013

(30) Foreign Application Priority Data
Jul. 29, 2011 (KR) .................. 10-2011-0075609

(51) Int. Cl.
*B29C 39/42* (2006.01)
*H02K 15/12* (2006.01)
(Continued)

(52) U.S. Cl.
CPC ............ *B29C 39/42* (2013.01); *H02K 15/12* (2013.01); *B29C 39/10* (2013.01); *B29L 2031/749* (2013.01); *B29C 2791/006* (2013.01)
USPC ....................................... 264/102; 425/129.1

(58) Field of Classification Search
CPC ..................................................... H02K 15/12
USPC ........................................ 264/102; 425/129.1
See application file for complete search history.

(56) References Cited

U.S. PATENT DOCUMENTS 5,149,483 A * 9/1992 Okey et al. ................ 264/272.19
5,415,892 A * 5/1995 Nishizawa ..................... 427/295
(Continued)

FOREIGN PATENT DOCUMENTS

JP 58-064015 4/1983
JP 2009-022088 A 1/2009
(Continued)

OTHER PUBLICATIONS

WSF Industries, "Vacuum Pressure Impregnation (VPI) Systems", copyright 2003-2009, accessed at www.wsfindustries.com/VPI.htm on Mar. 25, 2014.*
(Continued)

*Primary Examiner* — Alison Hindenlang
(74) *Attorney, Agent, or Firm* — Rabin & Berdo, P.C.

(57) ABSTRACT

An apparatus and method for fabricating a stator of a super-high-speed induction motor, in which the process of loading a stator on which a coil is completely wound into a mold, injecting a functional resin into a chamber, converting the inside of the chamber into the vacuum state, and pressurizing the inside of the chamber is carried out so that bubbles are removed from the inside and the surface of the functional resin and the functional resin is completely filled between the inner circumference of the stator and the inner circumference of the mold, thereby maximizing heat conductivity and insulation, preventing the stator from deteriorating, and improving the performance and endurance of the super-high-speed induction motor. In addition, since the vacuum step and the pressurizing step include heating the mold, in the vacuum step, the viscosity of the functional resin can be decreased so that the process of removing gas inside the stator can be efficiently performed and the solidification time of the functional resin can be decreased so that the working time can be decreased, and in the pressurizing step, the molding that is under pressing force is completely solidified. Furthermore, the height of the receiving section of the mold and the height of the central shaft are adjusted so that the winding section of the stator is completely immersed, and the chamber is provided with a vacuum tube and a pressurizing tube in order to facilitate the step of injecting the functional resin and the pressuring step. The method includes (a) loading a stator having a coil, which is completely wound on a core, into a mold, (b) injecting a functional resin into the mold so that a winding section of the stator is immersed, (c) inserting the mold, into which the functional resin is injected, into a closed chamber, (d) removing bubbles by converting the inside of the chamber into a vacuum state through a vacuum tube, which is provided in the chamber, so that the functional resin is filled across the entire portions of the stator, including the core and the coil, and between the inner circumference of the stator and the inner circumference of the mold, and (e) removing bubbles by increasing the gas pressure in the chamber, so that the functional resin is filled across the entire portions of the stator, including the core and the coil, and between the inner circumference of the stator and the inner circumference of the mold.

2 Claims, 7 Drawing Sheets

(51) Int. Cl.
*B29C 39/10* (2006.01)
*B29L 31/00* (2006.01)

(56) References Cited

U.S. PATENT DOCUMENTS

| | | | |
|---|---|---|---|
| 5,875,540 | A | 3/1999 | Sargeant et al. |
| 6,201,334 | B1 | 3/2001 | Sargeant et al. |
| 6,321,439 | B1 | 11/2001 | Berrong et al. |
| 2009/0015094 | A1 | 1/2009 | Yoshitake |

FOREIGN PATENT DOCUMENTS

| | | |
|---|---|---|
| KR | 1981-0000784 B1 | 7/1981 |
| KR | 10-2000-0070313 A | 11/2000 |

OTHER PUBLICATIONS

International Search Report of PCT/KR2011/005993 mailed on Jun. 29, 2012.

\* cited by examiner

DEVICE AND METHOD FOR MANUFACTURING STATOR OF ULTRA HIGH SPEED INDUCTION MOTOR

TECHNICAL FIELD

The present invention relates to an apparatus and method for fabricating a stator of a super-high-speed induction motor. More particularly, the invention relates to an apparatus and method for fabricating a stator of a super-high-speed induction motor, in which the process of loading a stator on which a coil is completely wound into a mold, injecting a functional resin into a chamber, converting the inside of the chamber into the vacuum state, and pressurizing the inside of the chamber is carried out so that bubbles are removed from the inside and the surface of the functional resin and the functional resin is completely filled between the inner circumference of the stator and the inner circumference of the mold, thereby maximizing heat conductivity and insulation, preventing the stator from deteriorating, and improving the performance and endurance of the super-high-speed induction motor. In addition, since the vacuum step and the pressurizing step include heating the mold, in the vacuum step, the viscosity of the functional resin can be decreased so that the process of removing gas inside the stator can be efficiently performed and the solidification time of the functional resin can be decreased so that the working time can be decreased, and in the pressurizing step, the molding that is under pressing force is completely solidified. Furthermore, the height of the receiving section of the mold and the height of the central shaft are adjusted so that the winding section of the stator is completely immersed, and the chamber is provided with a vacuum tube and a pressurizing tube in order to facilitate the step of injecting the functional resin and the pressuring step.

BACKGROUND ART

Motors are a type of machine that produces rotational power by converting electrical energy into mechanical energy. Motors are generally divided into alternating current (AC) motors and direct current (DC) motors, in which induction motors are a type of AC motors.

Induction motors are a representative type of AC motors in which current is induced to a secondary winding in response to electromagnetic induction of a first winding connected to a power supply. Rotational torque is produced due to interaction between the current induced to the secondary winding and a rotating magnetic field.

Such an induction motor generally includes a stator, a rotor, which is concentric with the stator and maintains a predetermined gap on the inner circumference of the stator, and a shaft, which is pressed into the central portion of the rotor and transfers rotational power of the rotor to a following shaft.

The stator includes a coil, which forms a rotating magnetic field in response to an AC source applied thereto, and a core, which forms a path of a magnetic flux generated by the rotating magnetic field. The stator core is implemented by stacking a plurality of circular electrical steel sheets on one another, each of which has a plurality of radial stator slots on the inner circumference thereof. The coil is wound through a stator slot by a variety of methods.

The rotating magnetic field is generated due to the AC source applied to the coil so that a magnetic flux rotates through the stator coil. The rotating magnetic flux intersects a rotor conductor, thereby inducing current to the rotor conductor. Here, the current induced to the rotor conductor cooperates with the magnetic flux to generate torque due to Fleming's left hand rule.

Such a stator of an induction motor is fabricated by winding a coil, which is a conductive wire, on a core considering its structural characteristic. This is an essential element for rotating the rotor by forming a rotating magnetic field due to alternating current.

However, when the power of the super-high-speed motor is greater or the super-high-speed motor is used for a longer time, the endurance of the super-high-speed motor degrades more due to heating. Therefore, efficient cooling is essential. When more heat is generated, the endurance of the induction motor deteriorates and insulation is subjected to irreversible deterioration.

A variety of cooling methods is applied in order to dissipate heat that is generated by the inductor motor. In an example, a method of cooling the stator due to heat exchange by forcibly introducing a circulation liquid into the stator is used. In addition, for the purpose of effective heat dissipation, cooling efficiency is increased by filling a hollow space present between the core and the coil, which constitute the stator, with a material having excellent insulation and heat conductivity.

When the hollow space between the core and the coil is filled with the heat conductive material, a great number of bubbles are created inside the heat conductive material, between the heat conductive material and the core, and between the heat conductive material and the coil, thereby degrading heat conductivity. This consequently causes the problem of a localized increase in temperature, thereby creating thermal fracture.

DISCLOSURE

Technical Problem

Accordingly, the present invention has been made keeping in mind the above problems occurring in the related art, and is intended to provide an apparatus and method for fabricating a stator of a super-high-speed induction motor, in which bubbles are removed from the inside and the surface of the functional resin and the functional resin is completely filled between the inner circumference of the stator and the inner circumference of the mold, thereby maximizing heat conductivity and insulation and preventing the stator from deteriorating. Consequently, the performance and endurance of the super-high-speed induction motor can be improved. The process of removing gas inside the stator can be efficiently performed and the solidification time of the functional resin can be decreased so that the working time can be decreased. In addition, a molding is completely solidified.

Technical Solution

In an aspect, the present invention provides an apparatus for fabricating a stator of a super-high-speed induction motor. The apparatus includes a mold comprising a cylindrical can-shaped receiving section, which is formed higher than a winding section of the stator such that the stator with a coil completely wound on a core is completely received therein, and a cylindrical central shaft, which is connected to the central portion of the bottom surface of the receiving section and is formed higher than the receiving section, and a chamber, which receives the mold therein, and comprises a heating section, which heats the mold, and a vacuum tube, which provides the mold with a vacuum state.

In addition, the chamber may further include a pressurizing tube, which removes residual bubbles in the inside and the surface of a functional resin, which is injected into the mold.

In another aspect, the present invention provides a method for fabricating a stator of a super-high-speed induction motor. The method includes the steps of: (a) loading a stator having a coil, which is completely wound on a core, into a mold; (b) injecting a functional resin into the mold so that a winding section of the stator is immersed; (c) inserting the mold, into which the functional resin is injected, into a closed chamber; (d) removing bubbles by converting the inside of the chamber into a vacuum state through a vacuum tube, which is provided in the chamber, so that the functional resin is filled across the entire portions of the stator, including the core and the coil, and between the inner circumference of the stator and the inner circumference of the mold; and (e) removing bubbles by increasing the gas pressure inside the chamber through a pressurizing tube, which is provided in the chamber, so that the functional resin is filled across the entire portions of the stator, including the core and the coil, and between the inner circumference of the stator and the inner circumference of the mold.

In addition, the step (d) and the step (e) may include heating the mold in order to decrease the viscosity and solidification time of the functional resin.

Furthermore, the step (d) may include opening the vacuum tube and closing the pressurizing tube, and the step (e) may include opening the pressurizing tube and closing the vacuum tube.

Advantageous Effects

According to the invention, the process of loading a stator on which a coil is completely wound into a mold, injecting a functional resin into a chamber, converting the inside of the chamber into the vacuum state, and pressurizing the inside of the chamber is carried out so that bubbles are removed from the inside and the surface of the functional resin and the functional resin is completely filled between the inner circumference of the stator and the inner circumference of the mold, thereby maximizing heat conductivity and insulation, preventing the stator from deteriorating, and improving the performance and endurance of the super-high-speed induction motor.

In addition, according to the invention, since the vacuum step and the pressurizing step include heating the mold, in the vacuum step, the viscosity of the functional resin can be decreased so that the process of removing gas inside the stator can be efficiently performed and the solidification time of the functional resin can be decreased so that the working time can be decreased, and in the pressurizing step, the molding that is under pressing force is completely solidified.

Furthermore, according to the invention, the height of the receiving section of the mold and the height of the central shaft are adjusted so that the winding section of the stator is completely immersed, and the chamber is provided with a vacuum tube and a pressurizing tube in order to facilitate the step of injecting the functional resin and the pressuring step.

BEST MODE

Figure 1:
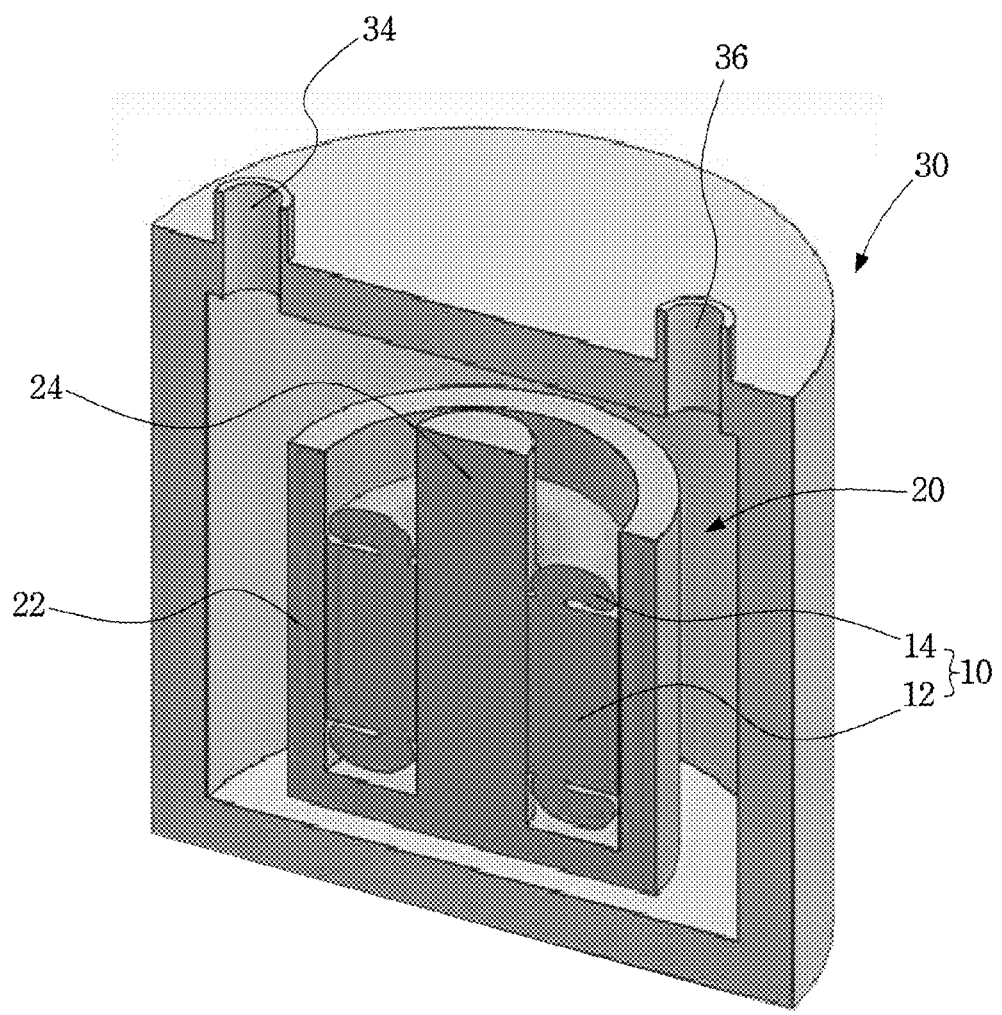
FIG. 1 is a partially cutaway perspective view of an apparatus for fabricating a stator of a super-high-speed inductor motor according to an exemplary embodiment of the invention.

According to a best embodiment of the invention, provided is a method for fabricating a stator of a super-high-speed induction motor. The method includes the steps of: (a) loading a stator having a coil, which is completely wound on a core, into a mold; (b) injecting a functional resin into the mold so that a winding section of the stator is immersed; (c) inserting the mold, into which the functional resin is injected, into a closed chamber; (d) removing bubbles by converting the inside of the chamber into the vacuum state through a vacuum tube, which is provided in the chamber, so that the functional resin is filled across the entire portions of the stator including the core and the coil and between the inner circumference of the stator and the inner circumference of the mold; and (e) removing bubbles by increasing the gas pressure inside the chamber through a pressurizing tube, which is provided in the chamber, so that the functional resin is filled across the entire portions of the stator, including the core and the coil, and between the inner circumference of the stator and the inner circumference of the mold.

Mode for Invention

Hereinbelow, preferred embodiments of the present invention will be described in detail with reference to the accompanying drawings. It should be understood that, when parts of the drawings are designated with reference numerals, the same reference numerals are used wherever possible throughout the different drawings in order to refer to the same or like parts. In addition, in the following description of the present invention, detailed descriptions of known functions and components incorporated herein will be omitted when they may make the subject matter of the present invention unclear. While the invention will be described in conjunction with exemplary embodiments thereof, the technical spirit of the present description is neither limited nor restricted thereto but a variety of modifications can be made and put into practice by a person having ordinary skill in the art.

Figure 2:
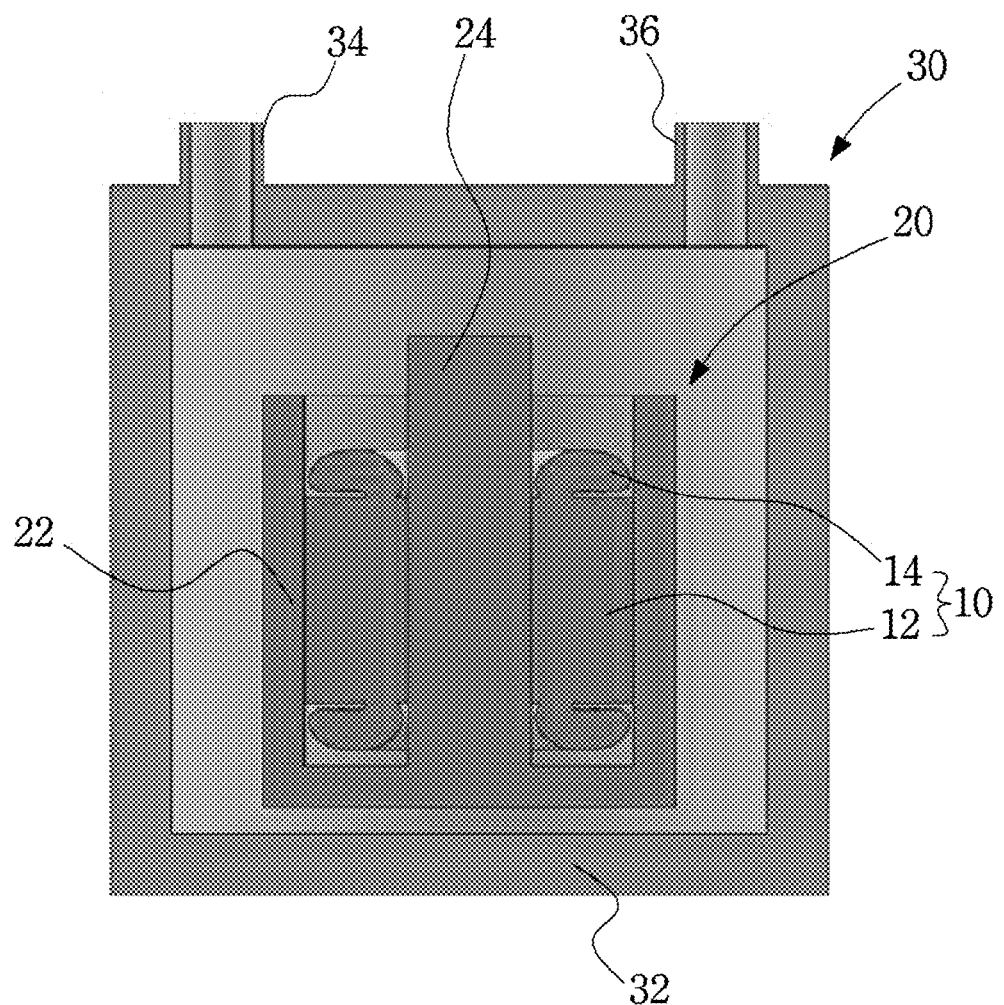
FIG. 2 is a front elevation view of FIG. 1.

FIG. 1 is a partially cutaway perspective view of an apparatus for fabricating a stator of a super-high-speed inductor motor according to an exemplary embodiment of the invention, and FIG. 2 is a front elevation view of FIG. 1.

Referring to FIG. 1 and FIG. 2, the apparatus for fabricating a stator of a super-high-speed inductor motor according to an exemplary embodiment of the invention includes a mold 20 and a chamber 30.

The mold 20 is a part that receives a stator 10 therein, and forms the stator 10 into a hollow cylindrical shape using a functional resin filled between a core 12 and a coil 14. It is preferable that the mold 20 be made of a metal material having excellent heat dissipation function.

The mold 20 includes a receiving section 22 and a central shaft 24.

The receiving section 22 is a part that receives the stator 10, and acts as a mold frame with which the functional resin is filled between the stator 10 and the receiving section 22. Specifically, the upper end of the receiving section 22 is open, thereby forming an upper opening, and the lower end of the receiving section 22 is closed, such that the receiving section 22 has the overall shape of a cylindrical can.

The core 12 is positioned in the central portion of the stator 10, and both ends of the coil 14 are positioned on both ends of the core 12. The coil is received in the receiving section 22, in the state in which the coil is disposed such that the coil portion positioned in the lower portion of the core 12 faces the bottom surface of the receiving section 22 and the coil portion positioned in the upper portion of the core 12 faces the upper opening of the receiving section 22. Accordingly, it is preferred that the height of the receiving section 22 be higher than that of winding sections of the stator (ends of the coil positioned on both sides of the core) so that the state 10 on which the coil 14 is completely wound can be completely received in the receiving section.

The central shaft 24 is connected to the center of the bottom surface of the receiving section 22, and is substantially cylindrical. The central shaft 24 is inserted into the opening of the stator 10, thereby fixing the stator 10 to the mold 20. Here, it is preferred that the central shaft 24 be formed higher than the receiving section 22 such that the stator 10 is easily inserted and the function resin does not stick to the upper end of the central shaft 24.

The chamber 30 receives the mold 20 therein, and carries out various processing, such as vacuum treatment, pressurizing and heating. The chamber 30 includes a heating section 32, which heats the mold 20, a vacuum tube 34, which provides the mold 20 with the vacuum state, and a pressurizing tube 36, which removes residual bubbles inside the functional resin injected into the mold 20.

The heating section 32 serves to decrease the viscosity and the solidification time of the functional resin by heating the mold 20 positioned in a vacuum atmosphere or a pressurizing atmosphere. Although the heating section 32 is shown as being positioned in the lower portion of the chamber 30 in FIG. 1 and FIG. 2 for the sake of convenience, this is merely an example but the heating section 32 can of course be provided in another position.

The vacuum tube 34 is provided in a portion of the chamber, and as shown in FIG. 1, may be formed in the upper periphery of the chamber 30. Here, one portion of the vacuum tube 34 (the lower portion in FIG. 1) communicates with the inside of the chamber 30, and the other portion of the vacuum tube 34 (the upper portion in FIG. 1) communicates with the outside of the chamber 30.

The vacuum tube 34 converts the inside of the chamber 30 into the vacuum state in order to remove bubbles so that the functional resin injected into the receiving section 22 of the mold 20 is filled across the entire portions of the stator 10, including the core 12 and the coil 14, and in the entire inner circumference of the stator 10 and the receiving section 22. For this, a vacuum device is connected to the vacuum tube 34.

The pressurizing tube 36 is provided in the other portion of the chamber 30, and as shown in FIG. 1, can be formed in the upper periphery of the chamber 30, spaced apart from the vacuum tube 34 at a predetermined interval. Here, one portion of the pressurizing tube 36 (the lower portion in FIG. 1) communicates with the inside of the chamber 30 and the other portion of the pressurizing tube 36 (the upper portion in FIG. 1) communicates with the outside of the chamber 30.

The pressurizing tube 36 pressurizes the inside of the chamber 30 using a gas so that the gas pressure inside the chamber 30 becomes a predetermined level or higher, thereby removing residual bubbles from the inside and the surface of the functional resin injected into the mold 20. For this, a gas compressing device is connected to the pressurizing tube 36.

Although it is typical that the vacuum tube 34 and the pressurizing tube 36 are separately provided as shown in FIG. 1, they can of course be formed as one tube having different inlets, such as a Y-shaped tube or a T-shaped tube.

As set forth above, since the residual bubbles formed in the inside and the surface of the functional resin is removed, the functional resin can penetrate into minute portions between the mold and the stator and be filled across the entire portions of the stator, including the core and the coil. Due to this, heat conductivity and insulation can be maximized when the stator is applied to a super-high-speed induction motor.

FIG. 3 to FIG. 11 show respective steps in the process of fabricating a stator of a super-high-speed induction motor according to an exemplary embodiment of the invention.

Figure 3:
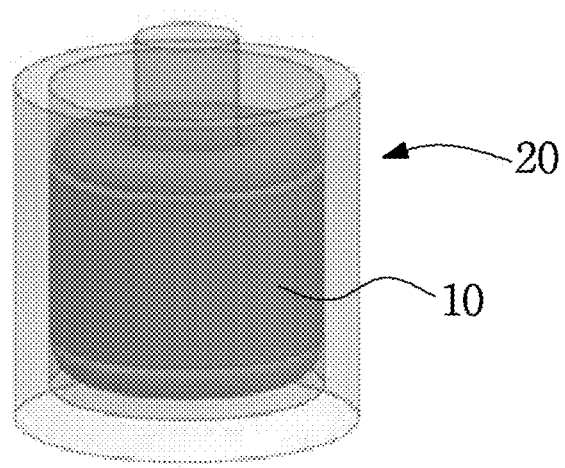
FIG. 3 is a perspective view showing the process of loading the stator in the mold.

FIG. 3 is a perspective view showing the process of loading the stator in the mold.

The stator 10 on which the coil is completely wound is loaded into the mold 20 that has excellent heat dissipation function. When the loading of the stator 10 is completed, the functional resin is injected into the mold 20 so that the winding sections of the stator 10 are immersed. Here, it is preferred that the functional resin be a solidifiable resin, which will form a stator molding, and have excellent insulation and heat conductivity. In an example, the functional resin of the invention is implemented as a thermosetting resin, but the invention is not limited thereto.

The thermosetting resin solidifies due to spontaneous heating when a main agent and a curing agent are mixed in a suitable ratio. The solidification time of the resin may be controlled by adjusting the ambient temperature. In addition to the mixing of the main agent and the curing agent, a method in which a single material is solidified due to heat applied thereto is also possible. Furthermore, a functional resin that spontaneously solidifies without thermosetting is also applicable.

Figure 4:
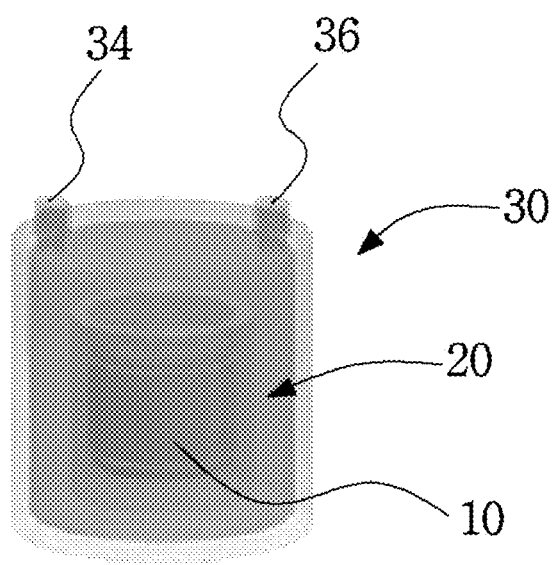
FIG. 4 is a transparent perspective view showing the state in which the mold is positioned inside the chamber.
Figure 5:
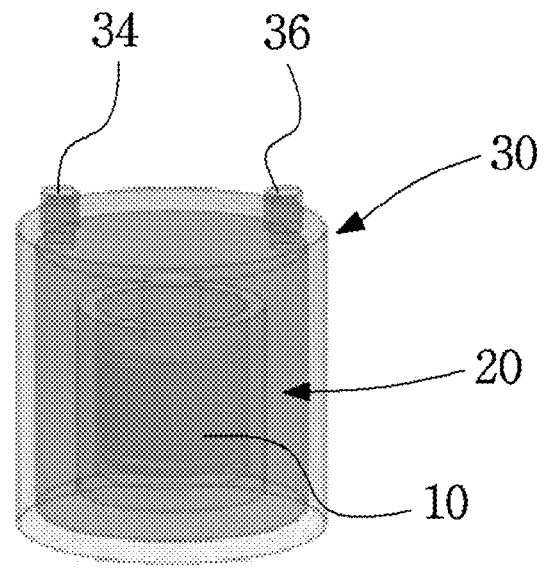
FIG. 5 is a perspective view showing the state in which the mold is positioned inside the chamber using hidden lines.
Figure 6:
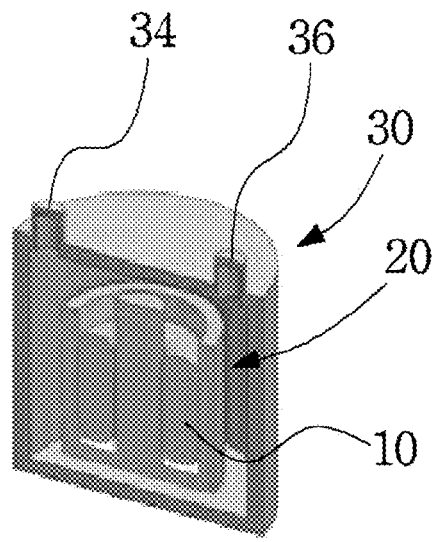
FIG. 6 is a partially cutaway perspective view showing the state in which the mold is positioned inside the chamber.
Figure 7:
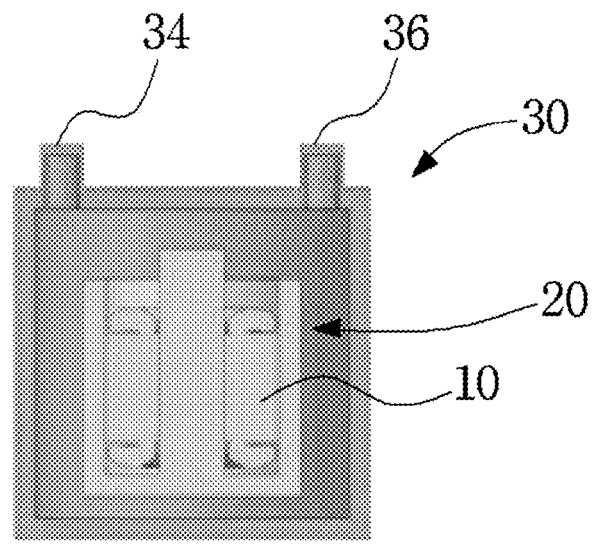
FIG. 7 is a front elevation view of FIG. 6.

FIG. 4 is a transparent perspective view showing the state in which the mold is positioned inside the chamber, FIG. 5 is a perspective view showing the state in which the mold is positioned inside the chamber using hidden lines, FIG. 6 is a partially cutaway perspective view showing the state in which the mold is positioned inside the chamber, and FIG. 7 is a front elevation view of FIG. 6. Although FIG. 4 to FIG. 7 show the state of the mold before the resin is injected for the sake of convenience, it should be appreciated that the functional resin is already injected in fact.

The mold 20 into which the functional resin is injected is inserted into the closed chamber 30. Here, both the vacuum tube 34 and the pressurizing tube 36 are closed because the chamber 30 must remain in the airtight state.

Figure 8:
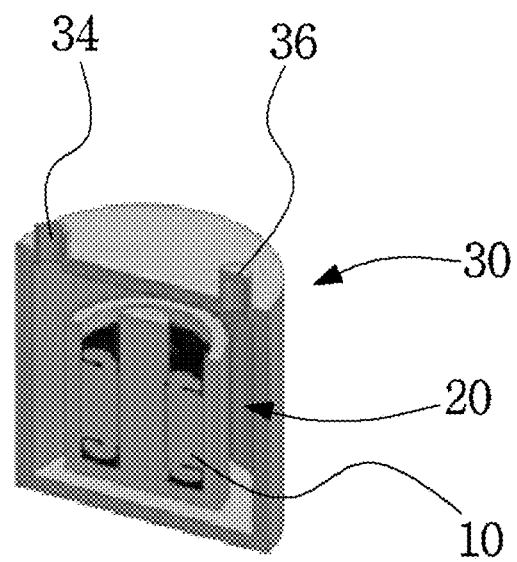
FIG. 8 is a partially cutaway perspective view showing the chamber in the vacuum state.
Figure 9:
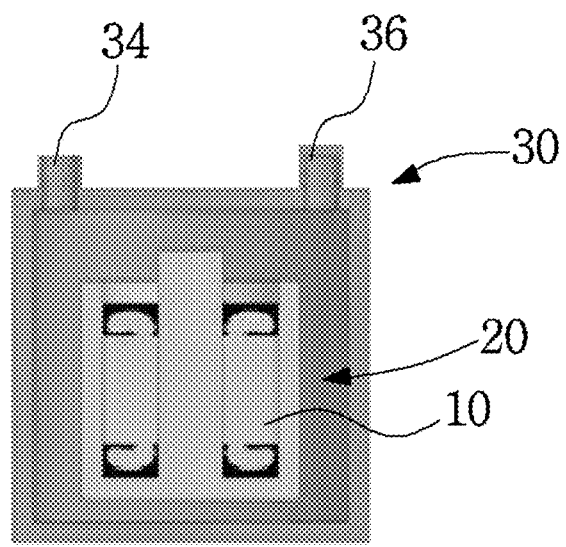
FIG. 9 is a front elevation view of FIG. 8.

FIG. 8 is a partially cutaway perspective view showing the chamber in the vacuum state, and FIG. 9 is a front elevation view of FIG. 8.

Bubbles are removed by converting the inside of the chamber 30 into the vacuum state through the vacuum tube 34 of the chamber 30, so that the functional resin injected into the mold 20 is filled across the entire portions of the stator 10, including the core and the coil. In this fashion, the gas is removed from the inside by increasing the degree of vacuum inside the chamber 30, so that the inside of the stator 10, which is loaded inside the mold 20, and all the corners of the winding sections can be sufficiently filled with the functional resin.

The vacuum step is performed in the state in which the vacuum tube 34 is open and the pressurizing tube 36 is closed. It is preferred that the degree of vacuum be approximately in the range from 1 to 10 torr such that bubbles occurring in the surface of the resin completely disappear, although the degree of vacuum may vary depending on the magnitude of facilities.

During the vacuum step, the mold 20 is gradually heated in order to decrease the viscosity but increase the flowability of the functional resin, so that the operation of removing gas from inside the stator 10 can be efficiently performed. In addition, the heating of the mold 20 can decrease the solidification time of the functional resin, thereby decreasing working time.

Figure 10:
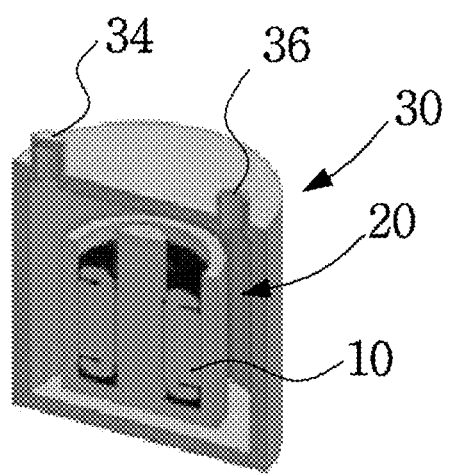
FIG. 10 is a partially cutaway perspective view showing the chamber in the pressurized state.
Figure 11:
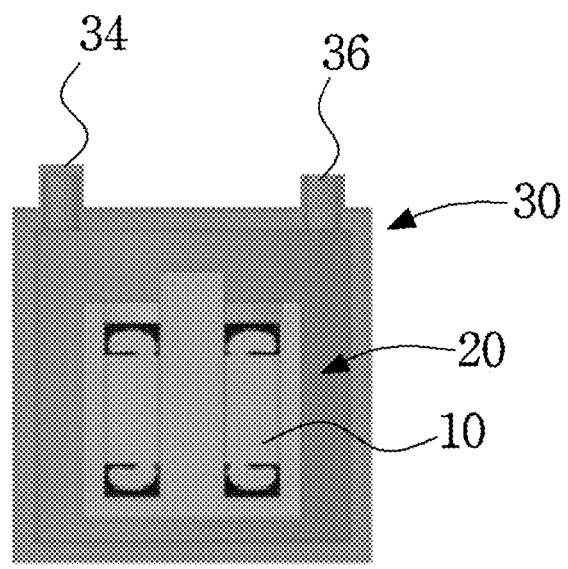
FIG. 11 is a front elevation view of FIG. 10.

FIG. 10 is a partially cutaway perspective view showing the chamber in the pressurized state, and FIG. 11 is a front elevation view of FIG. 10. The state of the mold after the functional resin is injected thereinto is also shown in FIG. 10 and FIG. 11.

Upon the completion of the vacuum process, the gas pressure inside the chamber 30 is increased through the pressurizing tube of the chamber 30 in order to remove bubbles so that the functional resin can be completely filled across the entire portions of the stator 10, including the core and the coil, and between the inner circumference of the stator 10 and the inner circumference of the mold 20. When the internal pressure is gradually increased with the vacuum tube 34 being closed and the pressurizing tube 36 being opened, the degree of vacuum inside the chamber 30 becomes the level of the atmospheric pressure and then gradually increases. A pressure medium that increases the pressure through the pressurizing tube 36 is a gas, which is insoluble to the molding and does not react with the functional resin. Consequently, the pressurizing process can be performed reliably.

Here, the functional resin is not completely solidified, and is under high pressing force due to the gas that is forcibly injected through the pressurizing tube 36, so that residual bubbles inside the mold 20 are removed and the functional resin completely penetrates into unmolded portions.

The pressurizing step is performed in the state in which the vacuum tube 34 is closed and the pressurizing tube 36 is open. It is preferred that the pressurizing force be approximately in the range from 10 to 100 MPa such that residual bubbles in the molding completely disappear, although the pressurizing force may vary depending on the magnitude of facilities.

During the pressuring step, the mold 20 is continuously heated, so that the molding that is under the pressurizing force is completely solidified.

In conditions that limit the final density of the molding, main factors are caused by the structure of bubbles and gases therein. As the pressure inside the chamber increases, the unmolded portions and bubbles inside the molding disappear, and thus the molding becomes sufficiently dense. In addition, since the minute residual bubbles are removed due to pressurized sintering, the surface of the final product of the stator is smoothened and heat conductivity and insulation are improved.

The foregoing descriptions have been presented in order to illustratively describe the technical principle of the present invention. It will be apparent to a person having ordinary skill in the art that various modifications and variations may be made without departing from the spirit and scope of the invention. The disclosed embodiments of the invention and the accompanying drawings are intended to be illustrative rather than limiting the technical principle of the invention. Therefore, the technical principle of the invention is not limited to these embodiments and accompanying drawings. It is intended that the scope of protection of the invention be should be construed by the appended claims and that all technical principles equivalent to the claims fall within the scope of the invention.

What is claimed is:

1. An apparatus for fabricating a stator of a induction motor, the stator formed by a coil surrounding a core and fixed thereto by a functional resin, comprising:
   a mold receiving the stator and including
      a cylindrical can-shaped receiving section having a height greater than that of a winding section of the stator such that the stator with the coil completely wound on the core is completely received therein, and
      a cylindrical central shaft fixed on a central portion of a bottom surface of the receiving section and having a height greater than that of the receiving section for preventing the functional resin from sticking to an upper end of the cylindrical central shaft; and
   a chamber receiving the mold therein and comprising
      a heater fixed in a bottom wall portion of the chamber for heating the mold,
      a vacuum tube provided in an upper side of the chamber for evacuating the interior of the chamber, and
      a pressurizing tube separate from the vacuum tube in the upper side of the chamber for pressurizing the chamber with a gas, thereby removing residual bubbles inside and on a surface of the functional resin.

2. A method for fabricating a stator of an induction motor, comprising:
   (a) preparing a mold which includes a cylindrical can-shaped receiving section and a cylindrical central shaft, the cylindrical central shaft being fixed to and projecting from a central portion of a bottom surface of the mold and having a height greater than that of the receiving section, for preventing a functional resin from sticking to an upper end of the cylindrical central shaft;
   (b) loading a stator having a coil and a core, into the mold;
   (c) injecting the functional resin into the mold so that the stator is immersed therein;
   (d) placing the mold, with the stator and the functional resin therein, into the chamber;
   (e) opening a vacuum tube provided in an upper side of the chamber and closing a pressurizing tube provided in the upper side of the chamber, and evacuating the chamber through the vacuum tube, the pressurizing tube being separate from the vacuum tube, and then opening the pressurizing tube and closing the vacuum tube and injecting a gas into the chamber through the pressurizing tube to increase a gas pressure inside the chamber, so that the functional resin fills all space between the core and the coil and between an inner circumference of the stator and an inner circumference of the mold; and
   (f) during the step (e), heating the mold in the chamber by a heater fixed in a bottom wall portion of the chamber, in order to decrease a viscosity and a solidification time of the functional resin.

* * * * *